United States Patent [19]

Popov et al.

[11] 4,232,237
[45] Nov. 4, 1980

[54] ASYNCHRONOUS LINE-FED MOTOR

[76] Inventors: Alexandr D. Popov, ulitsa Koroleva, 12, kv. 154; Vladimir A. Solomin, ulitsa Dachnaya, 14, kv. 31, both of Rostov-na-Donu, U.S.S.R.

[21] Appl. No.: 47,251

[22] Filed: Jun. 11, 1979

[30] Foreign Application Priority Data

Jun. 12, 1978 [SU] U.S.S.R. ............... 2632465

[51] Int. Cl.³ ............................................. H02K 41/00
[52] U.S. Cl. ...................................................... 310/13
[58] Field of Search ............................. 30/12-14

[56] References Cited

U.S. PATENT DOCUMENTS

| | | | |
|---|---|---|---|
| 3,585,423 | 6/1971 | Bolton et al. | 310/13 |
| 3,644,762 | 2/1972 | Eastham | 310/13 |
| 3,886,383 | 5/1975 | Ross et al. | 310/12 |

FOREIGN PATENT DOCUMENTS 2062622  9/1969  France .

OTHER PUBLICATIONS

"Asynchronous Line-Fed Transverse Magnetic Flux Closure Motor Designs", Popov et al., Rostov-on-Don Institute of Railway Engineers, 1977.

*Primary Examiner*—Donovan F. Duggan
*Attorney, Agent, or Firm*—Fleit & Jacobson

[57] ABSTRACT

An asynchronous line-fed motor comprising an inductor with a concentrated multiphase winding and a magnetic circuit, and a secondary current-carrying element arranged close to the inductor and separated by an air gap from the magnetic circuit which comprises two groups of laminated cores formed by rods which are linked by a yoke. The lamination of cores of the first group is perpendicular to the direction of travel of the magnetic field; the lamination of the cores of the second group is parallel with the direction of travel of the magnetic field. The laminated cores of the second group are trapezium-shaped; their rods are received in slots of the laminated cores of the first group to produce active zones with flat surfaces, facing the secondary current-carrying element. One part of coils of the concentrated multiphase winding is wound around the rods of the laminated cores of the first group; the second part of the coils of the concentrated multiphase winding is wound around the yokes of the laminated cores of the second group.

2 Claims, 2 Drawing Figures

ASYNCHRONOUS LINE-FED MOTOR

FIELD OF THE INVENTION

The present invention relates to electrical machines and, more particularly, to asynchronous line-fed motors.

The motor according to the invention can be used as a traction motor in high-speed locomotives; it is also readily applicable to conveyers and various electric drives whereof the working members are set in straight-line or reciprocating motion.

BACKGROUND OF THE INVENTION

There is known an asynchronous line-fed motor (cf. French Pat. No. 2,062,622, Cl. H 02 K, of 1971) comprising an inductor with a concentrated multiphase winding and a magnetic circuit composed of a number of separate laminated cores arranged transversely to the direction of travel of the magnetic field; the motor further includes a secondary element having a current-carrying portion mounted on a magnetically conducting base.

The motor under review has a limited efficiency and develops a relatively low tractive effort because of the non-uniform, i.e. stepwise, distribution of the magnetizing force inside the inductor.

There is further known an asynchronous line-fed motor (cf. an article by A. D. Popov and V. A. Solomin, entitled "Konstruktivnye ispolneniya asynchronnykh electrodvigateley s poperechnym zamykaniyem magnitnogo potoka" /"Designs of Asynchronous Motors with Transverse Closure of Magnetic Flux"/; the article is deposited with TsNIITEI under the Railway Ministry of the USSR, registration No. 663/78) comprising an inductor with a concentrated multiphase winding and a magnetic circuit, and a secondary current-carrying element separated by an air gap from the magnetic circuit which is composed of laminated cores. Each of the cores is formed by rods linked by a yoke. The laminated cores of the magnetic circuit are combined into two groups. The lamination of the cores of the first group is perpendicular to that of the second group. The cores of the second group connect adjacent laminated cores of the first group.

The inductor of this motor is serrated on the side of the secondary element in the direction transverse to that of travel of the magnetic field; this accounts for a non-uniform distribution of the magnetizing force in this direction, which, in turn, explains the low tractive effort and low efficiency of the motor.

SUMMARY OF THE INVENTION

It is an object of the present invention to increase the tractive effort of asynchronous line-fed motors.

It is another object of the invention to increase the efficiency of asynchronous line-fed motors.

The foregoing objects are attained by providing an asynchronous line-fed motor comprising an inductor with a concentrated multiphase winding, and a secondary current-carrying element separated by an air gap from the magnetic circuit which is composed of laminated cores whereof each is formed by rods linked by a yoke, the laminated cores being combined into two groups, the lamination of the cores of the first group being perpendicular to that of the cores of the second group which connect adjacent laminated cores of the first group, the motor being characterized, in accordance with the invention, in that each laminated core of the first group has at least one slot, the lamination of the cores of the first group being perpendicular to the direction of travel of the magnetic field, the laminated cores of the second group being trapezium-shaped, their rods being received in the slots of the adjacent cores of the first group, the lamination of the cores of the second group being parallel with the direction of travel of the magnetic field, one part of the coils of the concentrated multi-layer winding being wound around the rods of the laminated cores of the first group, whereas the other part of the coils of the concentrated multilayer winding is wound around the yoke of each of the laminated cores of the second group.

It is expedient that each laminated core of the first group should have "n" slots, where n is a positive integer, and that the rods of each laminated core of the second group should be received in the slots of the adjacent laminated cores of the first group.

The asynchronous line-fed motor according to the invention features an increased tractive effort and, consequently, an increased efficiency, as compared to conventional motors of this type. The improvement is due to the fact that the proposed motor design accounts for a uniform distribution of the magnetizing force in the air gap between the rods of the laminated cores and the secondary current-carrying element.

BRIEF DESCRIPTION OF THE ACCOMPANYING DRAWINGS

Other objects and advantages of the present invention will become more apparent from the following detailed description of preferred embodiments thereof, taken in conjunction with the accompanying drawings, wherein.

DETAILED DESCRIPTION OF THE INVENTION

Figure 1:
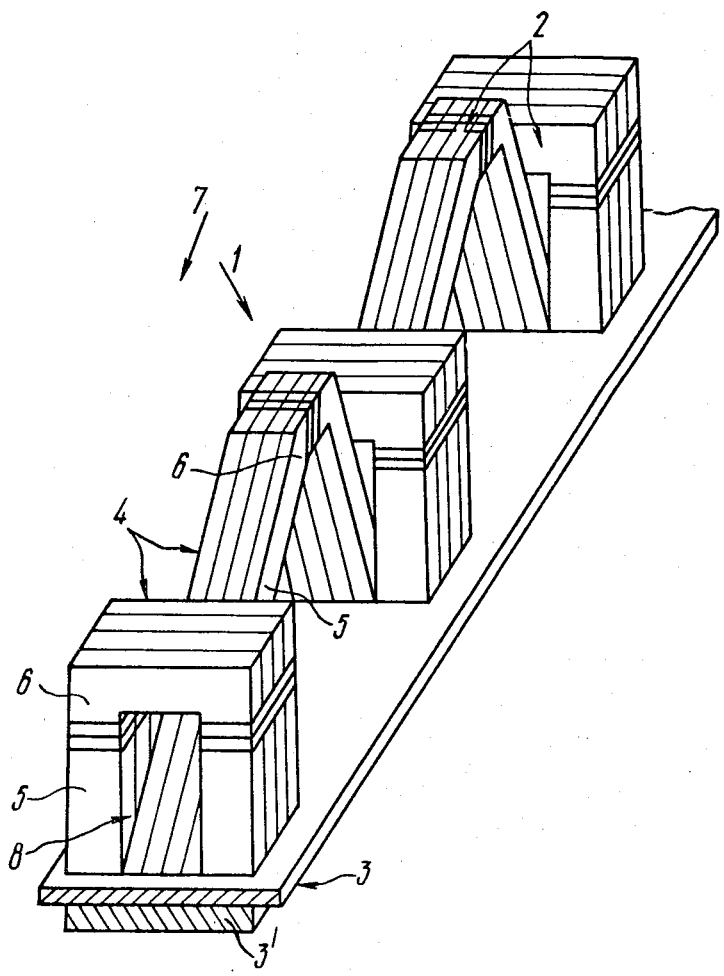
FIG. 1 is a general axonometric view of an asynchronous line-fed motor in accordance with the invention, wherein each of the laminated cores is provided with a single slot.

Referring to the attached drawings, the asynchronous line-fed motor according to the invention comprises an inductor 1 (FIG. 1) with a multiphase winding 2 and a magnetic circuit, and a secondary current-carrying element 3 mounted on a magnetically conducting base 3'. The magnetic circuit of the inductor 1 is composed of laminated cores 4 whereof each is formed by rods 5 linked by a yoke 6. There is an air gap between the secondary current-carrying element 3 and the rods 5 of the laminated cores 4. All the laminated cores 4 are combined into two groups. The lamination of the cores 4 of the first group is perpendicular to the direction of travel of the magnetic field, indicated by an arrow 7. The lamination of the cores 4 of the second group is parallel to the direction of travel of the magnetic field. Each laminated core 4 of the first group is shaped as an inverted U, i.e. has one slot 8 formed by the parallel rods 5 and the yoke 6. Each core 4 of the second group is trapezium-shaped, i.e. the rods 5 are at an angle to each other. This shape of the laminated cores 4 of the second group makes it possible to accommodate the rods 5 of the laminated cores 4 of the second group in the slots 8 of the adjacent laminated cores 4 of the first group.

One part of coils of the concentrated multiphase winding 2 is wound around the rods 5 of the laminated cores 4 of the first group; the other part of coils of the concentrated multiphase winding 2 is wound around the yokes 6 of the laminated cores 4 of the second group.

As stated above, the rods 5 of the laminated cores 4 of the second group are received in the slots 8 of the laminated cores 4 of the first group next to the rods 5 of said cores 4 of the first group; as a result, the surface of the magnetic circuit facing the secondary current-carrying element 3, which is also referred to as the active zone, is absolutely flat in the direction transverse to that of travel of the magnetic field.

Figure 2:
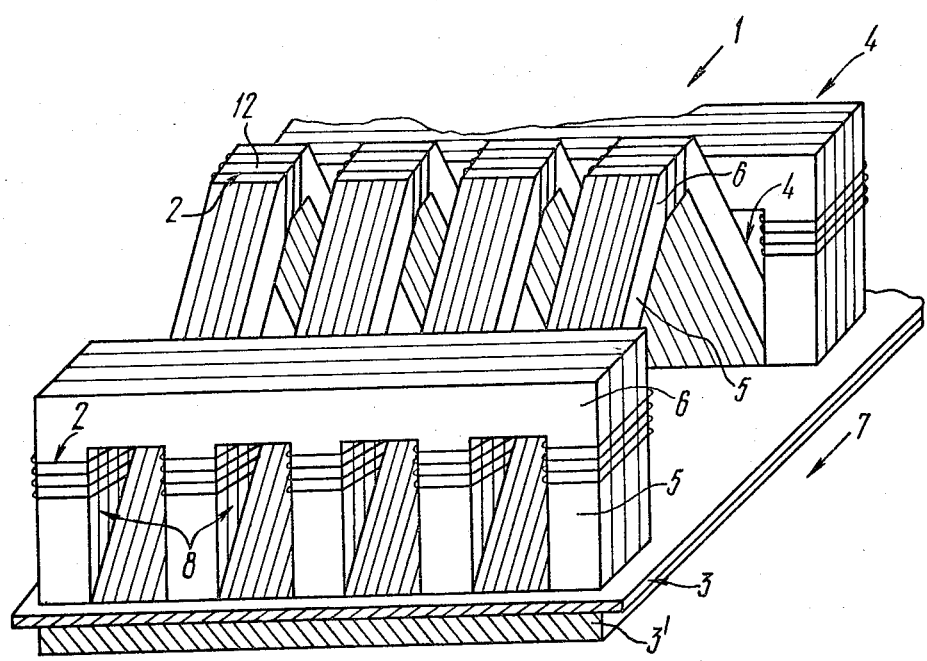
FIG. 2 is a general axonometric view of an asynchronous line-fed motor in accordance with the invention, wherein each of the laminated cores is provided with "n" slots.

The asynchronous line-fed motor of FIG. 2 also contains two groups of laminated cores 4, but in this case each of the laminated cores 4 of the first group is provided with "n" slots 8, where n is normally selected between 4 and 10, depending on the desired parameters of the motor. According to FIG. 2, n=4. The number of the laminated cores 4 of the second group is increased accordingly and is four times greater than that of the embodiments presented in FIG. 1. One part of the coils of the concentrated multiphase winding 2 is wound around all the rods 5 of each laminated core 4 of the first group; the other part of the coils is wound around all the yokes 6 of the laminated cores 4 of the second group. The plurality of slots 8 in the laminated cores 4 of the first group accounts for a uniform distribution of the magnetizing force in the air gap between the secondary current-carrying element 3 and the inductor 1.

Consider now operation of the asynchronous line-fed motor in accordance with the invention.

As the concentrated multiphase winding 2 (FIG. 2) of the inductor 1 is connected to a three-phase voltage source (not shown), it produces a magnetic field traveling in the direction indicated by the arrow 7. The magnetic field traverses the secondary current-carrying element 3 and induces electromotive forces therein. These forces produce eddy currents which interact with the traveling magnetic field of the inductor 1 to produce a traction force which pushes the inductor 1 in the direction opposite to that of the arrow 7. The active zone of the magnetic circuit is flat in the direction perpendicular to that of the arrow 7; the result is a highly uniform distribution of the magnetizing force with the shape of the distribution curve being close to the sinusoidal. The greater uniformity of the distribution of the magnetizing force accounts for a greater tractive effort and an improved efficiency of the motor.

To summarize, the invention makes it possible to increase the tractive effort and efficiency of asynchronous line-fed motors. This, in turn, makes it possible to increase traction power of locomotives and cut down operational costs.

What is claimed is:

1. An asynchronous line-fed motor comprising:
    an inductor with a magnetic circuit and a concentrated multiphase winding;
    a secondary current-carrying element arranged in immediate proximity to said inductor and separated by an air gap from said magnetic circuit;
    said magnetic circuit containing two groups of laminated cores;
    each of said laminated cores being composed of rods linked by a yoke;
    said inductor and said secondary current-carrying element being movable relative to each other to produce a traveling magnetic field;
    the lamination of said cores of the first group being perpendicular to the direction of travel of the magnetic field, said laminated cores of the first group being arranged in a row parallel with the direction of travel of the magnetic field;
    said laminated cores of the second group being trapezium-shaped, their lamination being parallel with the direction of travel of the magnetic field;
    each of said laminated cores of the first group being provided with at least one slot;
    each of said laminated cores of the second group having rods received in said slots of the adjacent laminated cores of the first group;
    said concentrated multiphase winding containing a set of coils;
    one part of said coils of said concentrated multiphase winding being wound around said rods of said laminated cores of the first group;
    the other part of said coils of said concentrated multiphase winding being wound around said yokes of said laminated cores of the second group.

2. An asynchronous line-fed motor as claimed in claim 1, wherein the lamination of the cores of the first group is perpendicular to the direction of travel of the magnetic field;
    each of said laminated cores of the first group being provided with "n" slots;
    said rods of said laminated cores of the second group being received in each of the "n" slots of said laminated cores of the first group, n being a positive integer.

* * * * *